United States Patent [19]

Bischoff et al.

[11] Patent Number: 4,827,406
[45] Date of Patent: May 2, 1989

[54] MEMORY ALLOCATION FOR MULTIPLE PROCESSORS

[75] Inventors: Gary Bischoff, Saugerties, N.Y.; Dag R. Blokkum, Austin, Tex.; Antonio de Leon Peñaloza, III, Cedar Park, Tex.; David L. Peterson, Austin, Tex.

[73] Assignee: International Business Machines Corporation, Armonk, N.Y.

[21] Appl. No.: 34,255

[22] Filed: Apr. 1, 1987

[51] Int. Cl.[4] .............................................. G06F 12/06
[52] U.S. Cl. ................................. 364/200; 364/254.3; 364/253.2; 364/238.4; 364/245.5
[58] Field of Search ... 364/900 MS File, 200 MS File

[56] References Cited

U.S. PATENT DOCUMENTS

| 4,173,783 | 11/1979 | Couleur et al. | 364/200 |
| 4,481,573 | 11/1984 | Fukunaga et al. | 364/200 |
| 4,622,631 | 11/1986 | Frank et al. | 364/200 |
| 4,669,043 | 5/1987 | Kaplinsky | 364/200 |

Primary Examiner—Gareth D. Shaw
Assistant Examiner—Christina M. Eakman
Attorney, Agent, or Firm—Douglas H. Lefeve

[57] ABSTRACT

A plurality of processors or intelligent controllers separately utilize discrete pages of a large memory. Within each of these pages a processor can address a plurality of subdivisions or blocks utilizing the processors' address lines. Thus, separate processors having access to this memory and having a limited addressing capability can utilize a plurality of different pages of this memory, within an identical address range, and nevertheless remain confined to separate memory environments established for each of the separate processors. This is accomplished by use of a hardware register to point the separate processors to their assigned pages of the memory and a stored translate table to point to particular blocks of memory within the pages in accordance with a portion of an address generated by the processor accessing the memory.

13 Claims, 4 Drawing Sheets

MEMORY ALLOCATION FOR MULTIPLE PROCESSORS

TECHNICAL FIELD

This invention relates to data processing systems in general, and more particularly to the hardware management of the addressing of separate sections of a large memory pool by a plurality of processors.

BACKGROUND ART

With the dramatic decrease in costs of data processing equipment in recent years there have been a number of significant advances in data processing equipment for use in homes and small offices. While such equipment, often referred to as "personal computers", initially was utilized to do one task at a time, software became available to allow two or more application programs to utilize the single microprocessor by alternating their utilization thereof. This solution allowed more than one task to be performed at a time, but the speed of operation of the tasks were, of course, slower than when each task had full use of the single microprocessor.

One way to solve the above-mentioned speed problem was to utilize a faster processor, and this is one of the advances in data processing equipment that has become available. However, in some cases, the availability of software to fully utilize the increased potential of more powerful processors has lagged behind the development of the faster microprocessors.

Currently available software may be utilized, nevertheless, in multitasking systems by using multiple processors of the more elementary type, for which the software was developed. When multiple processors are used, however, there must be some control over when, and in what priority, the multiple processors have access to resources such as system memory.

In one prior art system employing a main processor and a secondary processor (co-processor) sharing utilization of a single bus, the main processor, with the aid of an advanced operating system, allocated portions of a large, main memory to various devices, such as the co-processor, direct memory access controller (DMA), and other intelligent controllers. However, such a sophisticated operating system is not commonly utilized with the so called "personal computers".

Another approach to the allocation of memory to multiple processors has been to provide separate memory for these additional processors or other intelligent controllers, which, for the remainder of this description will be referred to, hereinafter, as busmaster devices. This solution is found, for example, in some of the color or graphics display adapter cards, which often include a significant portion of memory on the card. This eliminates the need for a highly sophisticated operating system to allocate main memory space to the functions provided by the adapter card, but is not a practical solution for the large amount of memory that might be desired to support the addition of a general purpose co-processor intended to concurrently run an additional application program which might require a relatively large amount of memory.

It would, therefore, be highly advantageous to provide a large, common memory to be allocated in subdivisions, or pages, to each of a plurality of processors sharing a bus, without the necessity of utilizing a highly advanced operating system or "on-board", rigidly dedicated memory, individually associated with the each of the processors.

SUMMARY OF THE INVENTION

Accordingly, a technique is provided to allow a plurality of processors to utilize discrete pages of a large memory. Within each of these pages a processor can address a plurality of subdivisions or blocks. Thus, separate processors having access to this memory and having a limited addressing capability can utilize a plurality of different pages of this memory, within an identical address range, and nevertheless remain confined to separate memory environments established for each of the separate processors.

Devices to which memory pages are allocated are assigned device addresses which are conveyed by a device arbitration bus to address a busmaster device register. The busmaster device register gives a memory page address which is combined with the highest order portion of a memory address conveyed by the personal computer address bus. This combination is applied to a translate table which points to a particular subdivision or block of memory within a particular page. The lower order portion of the memory address conveyed by the personal computer address bus addresses the particular storage location within the particular block of the particular page. By choosing the page size to be within the maximum memory size addressable by the processor a very large pool of memory can have multiple pages separately assigned to mulitple devices while being controlled by the hardware register and table technique of this invention.

The foregoing and other objects, features, extension, and advantages of the invention will be apparent from the following more particular description of a preferred embodiment of the invention, as illustrated in the accompanying drawings.

DETAILED DESCRIPTION OF THE PREFERRED EMBODIMENT

Figure 1:
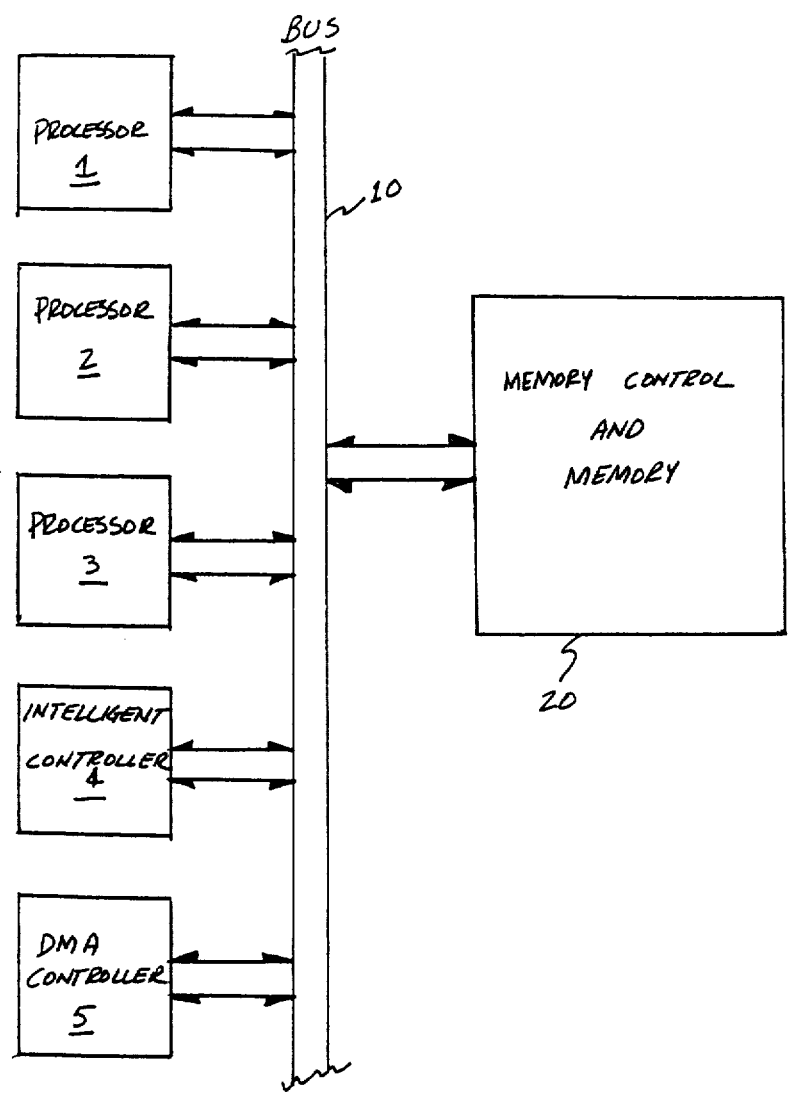
FIG. 1 is a block diagram of a portion of a personal computer system which includes a plurality of processor or intelligent controller devices which utilize discrete portions of a large memory resource.

Referring now to FIG. 1, a block diagram of a portion of a personal computer system is shown. For purposes of clarity, only that portion of the system pertinent to this invention is included in FIG. 1, although those skilled in the art will recognize that other components, such as display devices and ports to serial or parallel input/output devices such as printers and storage devices would ordinarily be included in the total personal computer system.

In FIG. 1, a bus 10 is shown which includes a plurality of data lines, a plurality of address lines, and a plurality of control lines. Connected to this bus 10 are a plurality of processors, depicted as processor 1, processor 2, and processor 3. In addition, an intelligent controller 4 is also connected to the bus 10, which may be, for example, a microprocessor driven hard disk controller. A DMA controller 5 is also connected to the bus 10. As noted above, each of the devices 1–5 will be referred to hereinafter as busmaster devices. Also connected to the bus 10 is a memory control and memory 20 to which this invention is directed.

In prior art systems of the type in which a large memory was shared by a plurality of processors, a highly sophisticated operating system has been employed to apportion subdivisions of the memory for use by the separate processors. With the great abundance of computer programs already used with less sophisticated operating systems such as versions of the IBM Disk Operating System by Microsoft Corporation, it is highly advantageous to control the apportionment of subdivisions of a large memory resource among a plurality of processors or other intelligent controller devices without use of the Disk Operating System, since present versions of this operating system are incapable of this task. This apportionment is accomplished by the hardware of the present invention without reliance on the operating system.

Figure 2:
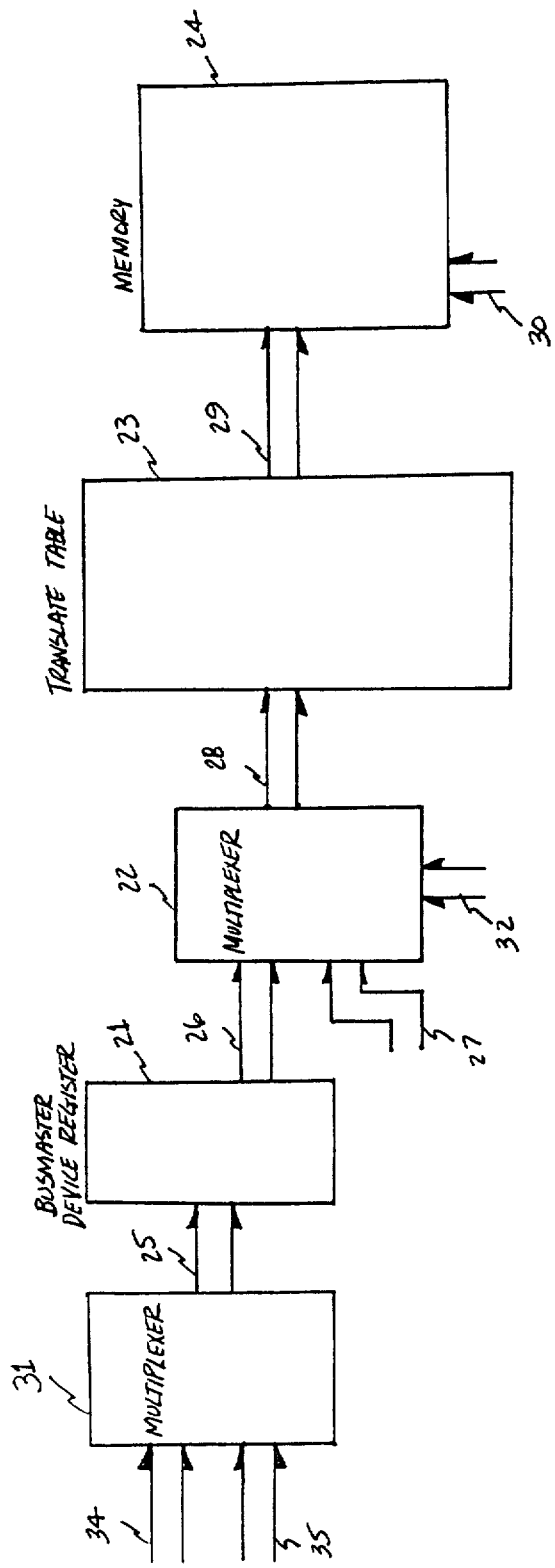
FIG. 2 is a block diagram of the memory control and memory 20 of FIG. 1.

Referring now to FIG. 2 a block diagram of the memory control and memory 20 of FIG. 1 is shown. In FIG. 2 a busmaster device register 21 receives a busmaster device arbitration address from the device attempting access of the memory. The address is received at the register 21 along a bus 25 from a multiplexer 31. This multiplexer 31 receives the busmaster arbitration address along bus 34 from the control portion of the personal computer bus. During system initialization the multiplexer 31 is selected to receive addresses for the busmaster register 21, loaded by I/O instructions from the personal computer through a bus 35, while in the normal operating mode the multiplexer 31 gates the busmaster device arbitration addresses from the bus 34 to the busmaster device register 21.

From this busmaster register 21 a memory page address is conveyed along a bus 26 to a multiplexer 22. Also applied to the multiplexer 22 on a bus 27 is a portion of a memory address generated by the personal computer. This portion of the memory address points to a subdivision or block of memory within the memory page derived from the busmaster device register 21.

The multiplexer 22 applies the above-described page and block addresses along a bus 28 to a translate table 23. During system initialization the multiplexer 22 is selected to receive addresses from a segment register, loaded by I/O instructions from the personal computer through a bus 32, while in the normal operating mode the multiplexer 22 gates the busmaster register 21 and high order personal computer address lines to the translate table 23. From the page and block addresses applied to the translate table 23 an address is derived for a particular block within a particular page of a large pool of a memory 24. Upon addressing, along a bus 29, the particular intended block within the intended page in memory 24, another portion of a memory address generated by the personal computer is applied along a bus 30 to the memory 24 to address the intended individual storage location within the particular block of the particular page of memory 24 addressed by the translate table 23.

The multiplexers 31 and 22 may, for example comprise commonly available TTL integrated circuit modules, such as AS158 multiplexers marketed by Texas Instruments.

Figure 3:
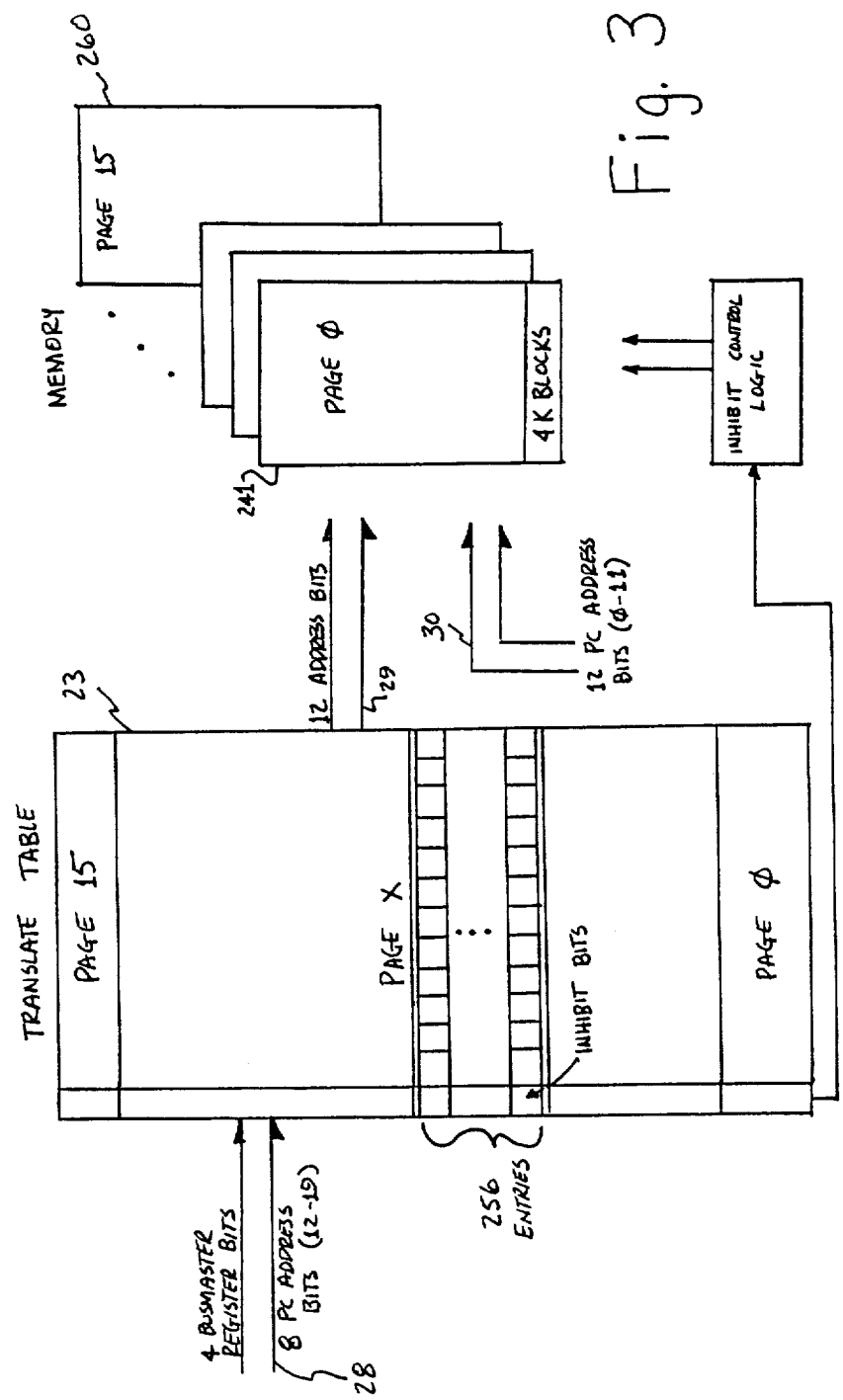
FIG. 3 is a diagram of the translate table and memory portion of the memory control and memory 20 of FIG. 1.

For a further description of the translate table and the operation of addressing a particular block within a particular page of the memory 24, reference is now made to FIG. 3. In FIG. 3, the memory 24 of FIG. 2 is shown as a succession of pages beginning with a first page 0 having a reference numeral 241 and a last page 15 having a reference numeral 260. Hereinafter, specific examples in terms of memory, register, and table sizes, as well as bus widths, will be used rather than generalized variables, although those skilled in the art will understand that this invention is not limited by the particular quantities used in the description thereof.

For this example, the memory pages each comprise one megabyte of storage and each of these pages is divided into 256 blocks, each having 4K of memory. The individual storage locations within a 4K block of memory within any of the pages is addressed by 12 address bits applied to the address bus 30. As mentioned above, these 12 address bits, 0–11, are the lowest order memory address bits generated by the personal computer.

Assuming, for this example, that there are 16 pages of memory, each having one megabyte of capacity and each being divided into 256, 4K blocks, a total of 4K of these blocks are contained within the entire memory. Accordingly, this requires 12 bits of addressing capability which are provided from the translate table 23 to the memory by the address bus 29.

In this example, the translate table 23 is a random access memory having 4K by 13 bits of storage. Each of the 4K groups of 13 bits represent one of the 4K blocks of storage in the memory, as described above. Twelve of the 13 bits within each of these 4K groups is used to access the particular one of the intended 4K blocks. Additionally, the 13th bit of each of these 4K groups is utilized to inhibit the addressing of particular portions of memory as will be described hereinafter. For now it is important to understand that 12 out of the 13 bits of a particular one of the 4K entries in the translate table 23 are the 12 bits conveyed along the address bus 29 to select the particular block of memory to be addressed by the address conveyed along the address bus 30 from the personal computer.

Since there are 4K entries in the translate table 23, it is required that a total of 12 bits be used to address these 4K entries. Eight of these bits are derived from the personal computer address bus while four of these bits are read from the busmaster device register 21. These 12 bits are conveyed to the translate table along the bus 28.

The translate table can be thought of as having a plurality of sections equal in number to the plurality of pages of memory. Thus, as shown in FIG. 3, the translate table 23 has 16 sections beginning with a page 0 section and ending with a page 15 section to correspond to the page 0 to page 15 succession of pages in the memory. Each particular one of the 16 sections corresponding to pages in the translate table 23 is addressed by a combination of the four busmaster device register bits from the busmaster device register 21. When the 4K entries of the translate table 23 are divided by 16, it will be understood that each of the 16 sections of the translate table 23 includes 256 of the 4K total entries. These 256 entries per page section of the translate table 23 correspond to the 256, 4K blocks of a one megabyte page of memory. The eight address bits derived from the personal computer address bus and conveyed along bus 28 to the translate table 23, therefore, are used to select which one of the 256 entries within a page section of the translate table 23 is desired.

In IBM Personal Computers and other personal computers compatible therewith which employ an Intel 8088 or 8086 microprocessor, there are a total of twenty address lines associated with the microprocessor. With twenty such address lines there is a one megabyte limit in the amount of memory which can be directly addressed by the microprocessor. Although advanced models of the IBM Personal Computer and other computers compatible therewith employ an Intel 80286 microprocessor which has twenty-four address lines, most of the software application programs intended for these computers are written with twenty address line limitation in mind to remain compatible with the lower performance 8088 and 8086 microprocessors. Although it is possible for the microprocessor to address 1 megabyte of memory with the twenty address lines, certain portions of this addressable space are left reserved for particular uses by the personal computer, such as display refresh buffers and read-only memory, such that typically only 640K of the addressable 1 megabyte of memory is availabe to the user. This is important to understand because certain ones of the 256 entries in each page section of the translate table 23 which are addressed by the eight highest order address bits 12–19 which are conveyed from the personal computer to the translate table along bus 28 may correspondingly point to particular 4K blocks within in the 1 megabyte address space which should not be accessible by a user. For this reason, the 13th bit (hereinafter referred to as the inhibit bit) in each of the entries in the translate table 23 is used to signify whether or not this memory space to which access may be attempted is memory space that may be utilized by the user program. This inhibit bit is read by the inhibit control logic 40 in FIG. 3 which, in response to this bit's being set to the inhibit binary state, prohibits any memory access to the pool of memory. For example, with dynamic random access memory, the inhibit control logic 41, upon sensing an inhibit bit in the inhibit state, interrupts the row address select, column address select and write enable lines of the memory control circuitry. With static random access memory the inhibit control logic 41, upon sensing a inhibit bit in the inhibit state, interrupts the write enable and output enable lines of the memory control circuitry.

It will, therefore, be understood by those skilled in the art that the twelve least significant bits from the personal computer address bus that point to the main memory plus the eight most significant bits from the personal computer address bus that point to the translate table comprise the total number of address bits necessary to address a one megabyte page.

Figure 4:
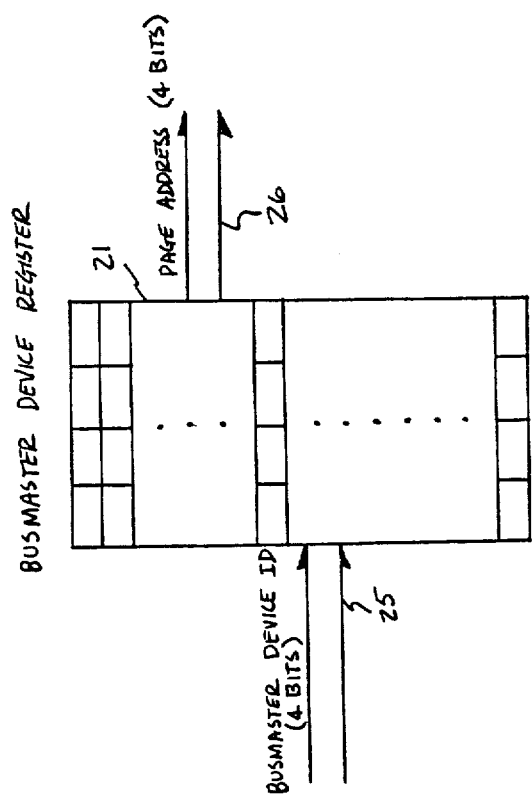
FIG. 4 is a diagram of the busmaster device register of the memory control and memory 20 of FIG. 1.

Reference is now made to FIG. 4 for a description of the busmaster device register 21 and the derivation of the page addresses based on device arbitration addresses. For the purposes of this description, assume that there may be a total of 16 processors or other intelligent controllers which may access the memory. This connotes a necessity of four bits on the device arbitration bus 25. The busmaster device register, therefore, contains 16 entries which correspond to this maximum number of 16 addresses provided by the device arbitration bus 25. Since there are also 16 pages of memory that are selected by this busmaster device register 21, each of the 16 entries in the busmaster device register 21 includes 4 page address bits. These bits in the busmaster device register 21 may be dynamically changed by the user or a multitasking operating system to enable a busmaster device's access to a plurality of memory pages. Or, if no such operating system is present, the busmaster register 21 can be loaded initially by a simple device driver or by a read only memory and never be changed thereafter, in which case the busmaster device has a single page of memory dedicated to itself.

For the purposes of clarity, the above description has been presented in terms of specific quantities of devices, memory blocks, pages, etc. The following description addresses the general case, without confining the examples to particulars sizes and quantities:

Assuming the arbitration levels presented to the multiplexer 31 have n lines then the busmaster device register 21 must be $2^{}n$ deep. If it is desired to have $2^{}m$ pages of memory the busmaster device register 21 will be m wide. Accordingly, register 21 is now a $2^{**}n \times m$ register.

If the main pages of memory are to be $2^{}q$ large then q address lines are required to reference it. The block sizes can be $2^{}p$ large. Therefore, the number of address lines going into the translate table 23 (from the main bus) will have to be $(q-p)$. The physical size of the translate table will be $2^{**}(q-p+m)$.

The main pool of memory can now be described as $2^{}r$ big. The translate table 23 will then be $(r-p+1)$ wide (the 1 is for the inhibit bit). Thus, the translate table size is now described as $2^{}(q-p+m)$ deep by $(r-p+1)$ wide.

In summary, memory allocation technique has been described in which a plurality of processors separately utilize discrete pages of a large memory. Within each of these pages a processor can address a plurality of subdivisions or blocks utilizing the processors' address lines. Thus, separate processors having access to this memory and having a limited addressing capability can utilize a plurality of different pages of this memory, within an identical address range, and nevertheless remain confined to separate memory environments established for each of the separate processors. This is accomplished by use of a hardware register to point the separate processors to their assigned pages of the memory and a stored translate table to point to particular blocks of memory within the pages in accordance with a portion of an address generated by the processor accessing the memory.

While the invention has been shown and described with reference to particular embodiments thereof, it will be understood by those skilled in the art that the foregoing and other changes in form and details may be made therein without departing from the spirit and scope of the invention.

We claim:

1. In a computer system having a plurality of busmasters connected to a common bus and a memory connectable to said bus, an improved control apparatus for allocating separate portions of said memory to separate ones of said plurality of busmasters, said apparatus comprising:
   means for receiving a busmaster device arbitration address from one of said busmasters, said one of said busmasters attempting access to said memory;
   register means connected to said means for receiving for storing and providing, in response to said arbitration address, a page portion address in a translate table which corresponds to a page portion of said memory to be accessible by said one of said busmasters, the number of memory locations within said page portion being no larger than an address range of a busmaster generated memory address; and memory addressing means connected to said register means and said memory for receiving a memory block address stored at a first address in said translate table, said first address including said page portion address and a first portion of said busmaster generated memory address on said bus, and addressing a particular block portion of said page portion of said memory.

2. In the computer system of claim 1, further comprising means for receiving a second portion of said busmaster generated memory address on said bus and addressing, within said particular block, an individual memory location which corresponds to said second portion of said busmaster generated memory address.

3. In the computer system of claim 2, wherein said means for receiving a busmaster device arbitration address further comprises a multiplexer.

4. In the computer system of claim 3, further comprising multiplexing means for conveying said page portion address and said first portion of said busmaster generated memory address to said translate table.

5. In the computer system of claim 4 wherein said memory comprises $2^{}m$ pages, said plurality of busmasters comprise $2^{}n$ busmasters and said register comprises $(2^{**}n) \times (m)$ storage locations.

6. In the computer system of claim 5 wherein said page portion of said memory comprises $2^{}q$ storage locations, said block portion of said page portion comprises $2^{}p$ storage locations and said first portion of said busmaster generated memory address comprises $(q-p)$ bits.

7. In the computer system of claim 6 wherein said memory comprises $2^{}r$ storage locations and said translate table comprises $(2^{}(q-p+m)) \times (r-p)$ storage locations.

8. In the computer system of claim 6, wherein said control apparatus further comprises inhibit control logic means connected to said memory and to said translate table for inhibiting reading from or writing to said memory.

9. In the computer system of claim 8 wherein said memory comprises $2^{}r$ storage locations and said translate table comprises $(2^{}(q-p+m)) \times (r-p+1)$ storage locations, wherein each one of said additional $2^{}(q-p+m)$ storage locations is separately associated with a separate block portion of said memory and said inhibit control logic means is responsive to an inhibit state of the contents of said additional $2^{}(q-p+m)$ storage locations.

10. In a computer system having a plurality of busmasters connected to a common bus and a memory connectable to said bus, the improved method for allocating separate portions of said memory to separate ones of said plurality of busmasters, comprising the steps of:

receiving a busmaster device arbitration address from one of said busmasters, said one of said busmasters attempting access to said memory;

storing in a register and sending, in response to said arbitration address, a page portion address in a translate table which corresponds to a page portion of said memory to be accessible by said one of said busmasters, the number of memory locations within said page portion being no larger than an address range of a busmaster generated memory address;

receiving a memory block address stored at a first address in said translate table, said first address including said page portion address and a first portion of a busmaster generated memory address on said bus; and addressing with memory addressing apparatus a particular block portion of said page portion of said memory which has said memory block address.

11. In the method claim 10, further comprising the steps of:

receiving a second portion of said busmaster generated memory address on said bus; and addressing, within said particular block, an individual memory location which corresponds to said second portion of said busmaster generated memory address.

12. In the method of claim 11, wherein said steps of receiving a busmaster device arbitration address and storing in a register further comprise conveying said busmaster device arbitration address from said one of said busmasters to said register by multiplexing.

13. In the method of claim 12, wherein said steps of receiving a memory block address and addressing a particular block portion further comprises conveying said page portion address and said first portion of said bustmaster generated memory address to said translate table by multiplexing.

* * * * *

UNITED STATES PATENT AND TRADEMARK OFFICE
CERTIFICATE OF CORRECTION

PATENT NO. : 4,827,406

DATED : 5-2-89

INVENTOR(S) : G. Bischoff et al

It is certified that error appears in the above-identified patent and that said Letters Patent is hereby corrected as shown below:

Col. 7, line 37, delete "(2(q-p+m)" and insert --(2(q-p+m))--.

Col. 7, line 46, delete "(2(q-p+m)" and insert --(2(q-p+m))--.

Col. 8, line 47, delete "bustmaster" and insert --busmaster--.

Signed and Sealed this

Seventh Day of April, 1992

Attest:

HARRY F. MANBECK, JR.

*Attesting Officer*    Commissioner of Patents and Trademarks